(12) United States Patent
Phillips

(10) Patent No.: US 12,244,250 B2
(45) Date of Patent: Mar. 4, 2025

(54) FEEDBACK SCALING FOR ELECTRIC MACHINES

(71) Applicant: Tula eTechnology, Inc., San Jose, CA (US)

(72) Inventor: Andrew W. Phillips, Rochester, MI (US)

(73) Assignee: Tula eTechnology, Inc., San Jose, CA (US)

( * ) Notice: Subject to any disclaimer, the term of this patent is extended or adjusted under 35 U.S.C. 154(b) by 169 days.

(21) Appl. No.: 18/306,862

(22) Filed: Apr. 25, 2023

(65) Prior Publication Data

US 2024/0022191 A1 Jan. 18, 2024

Related U.S. Application Data

(60) Provisional application No. 63/390,202, filed on Jul. 18, 2022.

(51) Int. Cl.
*H02P 21/00* (2016.01)
*H02P 21/08* (2016.01)
*H02P 21/10* (2016.01)

(52) U.S. Cl.
CPC ............. *H02P 21/08* (2013.01); *H02P 21/10* (2013.01); *H02K 2213/03* (2013.01)

(58) Field of Classification Search
CPC .............................. H02P 21/08; H02P 21/10
See application file for complete search history.

(56) References Cited

U.S. PATENT DOCUMENTS

| 4,441,043 A | 4/1984 | Decesare |
| 4,989,146 A | 1/1991 | Imajo |

(Continued)

FOREIGN PATENT DOCUMENTS

| CN | 1829070 A | 9/2006 |
| CN | 102381265 A | 3/2012 |

(Continued)

OTHER PUBLICATIONS

Cai et al., "Torque Ripple Reduction for Switched Reluctance Motor with Optimized PWM Control Strategy", https://www.mdpi.com/1996-1073/11/11/3215, Oct. 15, 2018, 27 pages.

(Continued)

*Primary Examiner* — Karen Masih
(74) *Attorney, Agent, or Firm* — Beyer Law Group LLP

(57) ABSTRACT

A control system for an electric machine, wherein the electric machine has a maximum bus value ($V_{bus}$) is provided. The control system is configured to determine a feedforward vector ($V_{FF}$), determine a feedback vector ($V_{FB}$), compare a magnitude of a sum of the feedforward vector and feedback vector ($|V_{FF}+V_{FB}|$) and the maximum bus value ($V_{bus}$), when $|V_{FF}+V_{FB}| \leq V_{bus}$ providing a control vector of $V_{FF}+V_{FB}$ to the electric machine, and when $|V_{FF}+V_{FB}| > V_{bus}$ providing a control vector of $V_{FF}+k(V_{FB})$ to the electric machine, where k is a scalar value between 0 and 1 inclusive where $|V_{FF}+k(V_{FB})|=V_{bus}$.

32 Claims, 6 Drawing Sheets

(56) References Cited

U.S. PATENT DOCUMENTS

| | | |
|---|---|---|
| 5,099,410 A | 3/1992 | Divan |
| 5,151,637 A | 9/1992 | Takada et al. |
| 5,325,028 A | 6/1994 | Davis |
| 5,483,141 A | 1/1996 | Uesugi |
| 5,640,073 A | 6/1997 | Ikeda et al. |
| 5,731,669 A | 3/1998 | Shimizu et al. |
| 6,291,960 B1 | 9/2001 | Crombez |
| 6,308,123 B1 | 10/2001 | Ikegaya et al. |
| 6,370,049 B1 | 4/2002 | Heikkila |
| 6,424,799 B1 | 7/2002 | Gilmore |
| 6,493,204 B1 | 12/2002 | Glidden et al. |
| 6,605,912 B1 | 8/2003 | Bharadwaj et al. |
| 6,829,515 B2 | 12/2004 | Grimm |
| 6,829,556 B2 | 12/2004 | Kumar |
| 6,906,485 B2 | 6/2005 | Hussein |
| 6,940,239 B2 | 9/2005 | Iwanaga et al. |
| 7,190,143 B2 | 3/2007 | Wei et al. |
| 7,259,664 B1 | 8/2007 | Cho et al. |
| 7,327,545 B2 | 2/2008 | Konishi |
| 7,411,801 B2 | 8/2008 | Welchko et al. |
| 7,453,174 B1 | 11/2008 | Kalsi |
| 7,558,655 B2 | 7/2009 | Garg et al. |
| 7,577,511 B1 | 8/2009 | Tripathi et al. |
| 7,616,466 B2 | 11/2009 | Chakrabarti et al. |
| 7,768,170 B2 | 8/2010 | Tatematsu et al. |
| 7,852,029 B2 | 12/2010 | Kato et al. |
| 7,960,888 B2 | 6/2011 | Ai et al. |
| 7,969,341 B2 | 6/2011 | Robbe et al. |
| 8,020,651 B2 | 9/2011 | Zillmer et al. |
| 8,099,224 B2 | 1/2012 | Tripathi et al. |
| 8,768,563 B2 | 7/2014 | Nitzberg et al. |
| 8,773,063 B2 | 7/2014 | Nakata |
| 9,046,559 B2 | 6/2015 | Lindsay et al. |
| 9,050,894 B2 | 6/2015 | Banerjee et al. |
| 9,308,822 B2 | 4/2016 | Matsuda |
| 9,495,814 B2 | 11/2016 | Ramesh |
| 9,512,794 B2 | 12/2016 | Serrano et al. |
| 9,630,614 B1 | 4/2017 | Hill et al. |
| 9,702,420 B2 | 7/2017 | Yoon |
| 9,758,044 B2 | 9/2017 | Gale et al. |
| 9,948,173 B1 | 4/2018 | Abu Qahouq |
| 10,060,368 B2 | 8/2018 | Pirjaberi et al. |
| 10,081,255 B2 | 9/2018 | Yamada et al. |
| 10,256,680 B2 | 4/2019 | Hunstable |
| 10,273,894 B2 | 4/2019 | Tripathi |
| 10,291,168 B2 | 5/2019 | Fukuta |
| 10,291,174 B2 | 5/2019 | Irie et al. |
| 10,320,249 B2 | 6/2019 | Okamoto et al. |
| 10,340,821 B2 | 7/2019 | Magee et al. |
| 10,344,692 B2 | 7/2019 | Nagashima et al. |
| 10,381,968 B2 | 8/2019 | Agirman |
| 10,476,421 B1 | 11/2019 | Khalil et al. |
| 10,550,776 B1 | 2/2020 | Leone et al. |
| 10,742,155 B2 | 8/2020 | Tripathi |
| 10,763,772 B1 | 9/2020 | Fatemi et al. |
| 10,944,352 B2 | 3/2021 | Mazda et al. |
| 11,077,759 B1 | 8/2021 | Srinivasan |
| 11,088,644 B1 | 8/2021 | Carvell |
| 11,133,763 B1 | 9/2021 | Islam |
| 11,133,767 B2 | 9/2021 | Serrano et al. |
| 11,167,648 B1 | 11/2021 | Carvell et al. |
| 11,228,272 B2 | 1/2022 | Tripathi |
| 11,427,177 B2 | 8/2022 | Serrano et al. |
| 11,623,529 B2 | 4/2023 | Carvell et al. |
| 11,626,827 B2 | 4/2023 | Tripathi |
| 11,628,730 B2 | 4/2023 | Srinivasan |
| 11,695,361 B2 | 7/2023 | Carvell et al. |
| 2001/0039926 A1 | 11/2001 | Kobayashi et al. |
| 2002/0043954 A1 | 4/2002 | Hallidy et al. |
| 2005/0127861 A1 | 6/2005 | McMillan et al. |
| 2005/0151437 A1 | 7/2005 | Ramu |
| 2005/0160771 A1 | 7/2005 | Hosoito et al. |
| 2006/0055363 A1 | 3/2006 | Patel et al. |
| 2007/0216345 A1 | 9/2007 | Kanamori |
| 2007/0287594 A1 | 12/2007 | DeGeorge et al. |
| 2008/0129243 A1 | 6/2008 | Nashiki |
| 2008/0179980 A1 | 7/2008 | Dawsey et al. |
| 2009/0045691 A1 | 2/2009 | Ichiyama |
| 2009/0121669 A1 | 5/2009 | Hanada |
| 2009/0127400 A1 | 5/2009 | Lavretsky et al. |
| 2009/0128072 A1 | 5/2009 | Strong et al. |
| 2009/0146615 A1 | 6/2009 | Zillmer et al. |
| 2009/0179608 A1 | 7/2009 | Welchko et al. |
| 2009/0306841 A1 | 12/2009 | Miwa et al. |
| 2010/0010724 A1 | 1/2010 | Tripathi et al. |
| 2010/0201294 A1 | 8/2010 | Yuuki et al. |
| 2010/0296671 A1 | 11/2010 | Khoury et al. |
| 2011/0029179 A1 | 2/2011 | Miyazaki et al. |
| 2011/0089774 A1 | 4/2011 | Kramer |
| 2011/0101812 A1 | 5/2011 | Finkle et al. |
| 2011/0130916 A1 | 6/2011 | Mayer |
| 2011/0208405 A1 | 8/2011 | Tripathi et al. |
| 2012/0056569 A1 | 3/2012 | Takamatsu et al. |
| 2012/0112674 A1 | 5/2012 | Schulz et al. |
| 2012/0169263 A1 | 7/2012 | Gallegos-Lopez et al. |
| 2012/0217916 A1 | 8/2012 | Wu et al. |
| 2012/0217921 A1 | 8/2012 | Wu et al. |
| 2013/0134912 A1 | 5/2013 | Khalil et al. |
| 2013/0141027 A1 | 6/2013 | Nakata |
| 2013/0226420 A1 | 8/2013 | Pedlar et al. |
| 2013/0241445 A1 | 9/2013 | Tang |
| 2013/0258734 A1 | 10/2013 | Nakano et al. |
| 2014/0018988 A1 | 1/2014 | Kitano et al. |
| 2014/0028225 A1 | 1/2014 | Takamatsu et al. |
| 2014/0130506 A1 | 5/2014 | Gale et al. |
| 2014/0176034 A1 | 6/2014 | Matsumura et al. |
| 2014/0217940 A1 | 8/2014 | Kawamura |
| 2014/0265957 A1 | 9/2014 | Hu et al. |
| 2014/0292382 A1 | 10/2014 | Ogawa et al. |
| 2014/0354199 A1 | 12/2014 | Zeng et al. |
| 2015/0025725 A1 | 1/2015 | Uchida |
| 2015/0240404 A1 | 8/2015 | Kim et al. |
| 2015/0246685 A1 | 9/2015 | Dixon et al. |
| 2015/0261422 A1 | 9/2015 | Den et al. |
| 2015/0297824 A1 | 10/2015 | Cabiri et al. |
| 2015/0318803 A1 | 11/2015 | Wu et al. |
| 2016/0114830 A1 | 4/2016 | Dixon et al. |
| 2016/0226409 A1 | 8/2016 | Ogawa |
| 2016/0233812 A1 | 8/2016 | Lee et al. |
| 2016/0269225 A1 | 9/2016 | Kirchmeier et al. |
| 2016/0373047 A1 | 12/2016 | Loken et al. |
| 2017/0087990 A1 | 3/2017 | Neti et al. |
| 2017/0163108 A1 | 6/2017 | Schencke et al. |
| 2017/0331402 A1 | 11/2017 | Smith et al. |
| 2018/0032047 A1 | 2/2018 | Nishizono et al. |
| 2018/0045771 A1 | 2/2018 | Kim et al. |
| 2018/0154786 A1 | 6/2018 | Wang et al. |
| 2018/0276913 A1 | 9/2018 | Garcia et al. |
| 2018/0323665 A1 | 11/2018 | Chen et al. |
| 2018/0334038 A1 | 11/2018 | Zhao et al. |
| 2019/0058374 A1 | 2/2019 | Enomoto et al. |
| 2019/0288629 A1 | 9/2019 | Tripathi |
| 2019/0288631 A1 | 9/2019 | Tripathi |
| 2019/0341820 A1 | 11/2019 | Krizan et al. |
| 2020/0212834 A1 | 7/2020 | Mazda et al. |
| 2020/0262398 A1 | 8/2020 | Sato et al. |
| 2020/0328714 A1 | 10/2020 | Tripathi |
| 2020/0343849 A1 | 10/2020 | Coroban-Schramel |
| 2020/0366223 A1 | 11/2020 | Coroban-Schramel |
| 2021/0146909 A1 | 5/2021 | Serrano et al. |
| 2021/0175827 A1 | 6/2021 | Ohno et al. |
| 2021/0203263 A1 | 7/2021 | Serrano et al. |
| 2021/0351733 A1 | 11/2021 | Carvell |
| 2022/0234451 A1 | 7/2022 | Srinivasan |
| 2022/0416707 A1 | 12/2022 | Chen |
| 2023/0114289 A1 | 4/2023 | Islam et al. |
| 2023/0219426 A1 | 7/2023 | Carvell et al. |
| 2023/0223885 A1 | 7/2023 | Tripathi |
| 2023/0253911 A1 | 8/2023 | Islam |

(56) References Cited

U.S. PATENT DOCUMENTS

| | | |
|---|---|---|
| 2023/0283211 A1 | 9/2023 | Carvell |
| 2023/0308040 A1 | 9/2023 | Farah et al. |

FOREIGN PATENT DOCUMENTS

| | | |
|---|---|---|
| CN | 104716754 A | 6/2015 |
| CN | 204589885 U | 8/2015 |
| CN | 105196877 A | 12/2015 |
| CN | 205229379 U | 5/2016 |
| CN | 106932208 A | 7/2017 |
| CN | 107067780 A | 8/2017 |
| CN | 207129052 U | 3/2018 |
| CN | 108216026 A | 6/2018 |
| CN | 108445386 A | 8/2018 |
| CN | 110212725 | 9/2019 |
| DE | 102014206342 | 10/2015 |
| EP | 2605398 A1 | 6/2013 |
| FR | 2989479 | 10/2013 |
| GB | 2273212 | 8/1994 |
| JP | 10243680 | 9/1998 |
| JP | 2008-079686 A | 4/2008 |
| JP | 2009-065758 A | 4/2008 |
| JP | 2011-67043 | 3/2011 |
| JP | 5165660 B2 | 12/2012 |
| JP | 2014-033449 A | 2/2014 |
| JP | 5857472 B2 | 12/2015 |
| JP | 2017-011970 A | 1/2017 |
| JP | 2017-200382 | 11/2017 |
| JP | 2018-033250 A | 3/2018 |
| JP | 2019-140815 | 8/2019 |
| JP | 2020048254 A | 3/2020 |
| KR | 10-0364016 | 12/2002 |
| KR | 10-2017-0021146 A | 2/2017 |
| KR | 10-2017-0032976 A | 3/2017 |
| WO | WO03/36787 A1 | 5/2003 |
| WO | WO2012-010993 A2 | 1/2012 |

OTHER PUBLICATIONS

Spong et al., "Feedback Linearizing Control of Switched Reluctance Motors", IEEE Transactions on Automatic Control, vol. AC-32, No. 5, May 1987, pp. 371-379.

Mirzaeva et al., "The use of Feedback Quantizer PWM for Shaping Inverter Noise Spectrum", Power Electronics and Motion Control Conference (EPE/PEMC), 2012 15$^{th}$ International IEEE, Sep. 4, 2012, pp. DS3c. 10-1, XP032311951, DOI: 10.1109/EPEPEMC.2012.6397346, ISBN: 978-1-4673-1970.6.

Luckjiff et al., "Hexagonal ΣΔ Modulators in Power Electronics", IEEE Transactions on Power Electronics, Institute of Electrical and Electronics Engineers, USA, vol. 20, No. 5, Sep. 1, 2005, pp. 1075-1083, XP011138680, ISSN: 0885-8993, DOI: 10.1109/TPEL.2005.854029.

Ramsey, "How This Father and Son's New Electric Turbine Could Revolutionize Electric Cars; Hunstable Electric Turbine can Produce up to Three Times the Torque of Any Other Motor", https://www.parsintl.com/publication/autoblog/, Mar. 8, 2020.

Islam, U.S. Appl. No. 18/165,100, filed Feb. 6, 2023.
Farah et al., U.S. Appl. No. 18/184,569, filed Mar. 15, 2023.
Phillips, U.S. Appl. No. 18/305,776, filed Apr. 24, 2023.
International Search Report and Written Opinion dated Oct. 10, 2023 from International Application No. PCT/US2023/026237.
Phillips, U.S. Appl. No. 18/348,255, filed Jul. 6, 2023.
Carvell et al., U.S. Appl. No. 18/362,602, filed Jul. 31, 2023.
Parsels et al., U.S. Appl. No. 18/452,363, filed Aug. 18, 2023.
Islam et al., U.S. Appl. No. 18/452,050, filed Aug. 18, 2023.
Islam et al., U.S. Appl. No. 18/452,260, filed Aug. 18, 2023.

FEEDBACK SCALING FOR ELECTRIC MACHINES

CROSS-REFERENCE TO RELATED APPLICATION

This application claims the benefit of priority of U.S. Application No. 63/390,202, filed Jul. 18, 2022, which is incorporated herein by reference for all purposes.

BACKGROUND

The present application relates generally to electric machines. The term "machine" as used herein is intended to be broadly construed to mean both electric motors and generators. Electric motors and generators are structurally very similar. Both include a stator having a number of poles and a rotor. When a machine is operating as a motor, it converts electrical energy into mechanical energy. When operating as a generator, the machine converts mechanical energy into electrical energy.

Feedforward and feedback voltages and/or currents may be used to provide a controlled torque and/or speed. An electric machine power system may have a maximum current and/or maximum voltage.

The background description provided here is for the purpose of generally presenting the context of the disclosure. The information described in this background section, as well as aspects of the description that may not otherwise qualify as prior art at the time of filing, are neither expressly nor impliedly admitted as prior art against the present disclosure.

SUMMARY

A variety of methods, controllers, and electric machine systems are described that facilitate pulsed control of a multiple electric machine (e.g., electric motors and generators) drive system to improve the energy conversion efficiency of the electric machines when operating conditions warrant. More specifically, a control system for an electric machine, wherein the electric machine has a maximum bus value ($V_{bus}$), is provided. The control system is configured to determine a feedforward vector ($V_{FF}$), determine a feedback vector ($V_{FB}$), compare a magnitude of a sum of the feedforward vector and feedback vector ($|V_{FF}+V_{FB}|$) and the maximum bus value ($V_{bus}$), when $|V_{FF}+V_{FB}| \leq V_{bus}$ providing a control vector of $V_{FF}+V_{FB}$ to the electric machine, and when $|V_{FF}+V_{FB}| > V_{bus}$ providing a control vector of $V_{FF}+k(V_{FB})$ to the electric machine, where $0 \leq k < 1$ and where $|V_{FF}+k(V_{FB})| = V_{bus}$.

In another embodiment, a system is provided comprising an electric machine, a power converter, and a control system, wherein the electric machine has a maximum bus value ($V_{bus}$). The control system is configured to determine a feedforward vector ($V_{FF}$), determine a feedback vector ($V_{FB}$), compare a magnitude of the sum of the feedforward vector and feedback vector ($|V_{FF}+V_{FB}|$) and the maximum bus value ($V_{bus}$), when $|V_{FF}+V_{FB}| \leq V_{bus}$, providing a control vector of $V_{FF}+V_{FB}$ to the electric machine, and when $|V_{FF}+V_{FB}| > V_{bus}$, providing a control vector of $V_{FF}+k(V_{FB})$ to the electric machine, where $0 \leq k < 1$ and where $|V_{FF}+k(V_{FB})| = V_{bus}$.

In another embodiment, a method for controlling an electric machine by an inverter controller arranged to direct a power converter is provided. A feedforward vector ($V_{FF}$) is determined. A feedback vector ($V_{FB}$) is provided. A magnitude of a sum of the feedforward vector and feedback vector ($|V_{FF}+V_{FB}|$) is compared to a maximum bus value ($V_{bus}$). When $|V_{FF}+V_{FB}| \leq V_{bus}$, a control vector of $V_{FF}+V_{FB}$ is provided to the electric machine. When $|V_{FF}+V_{FB}| > V_{bus}$, a control vector of $V_{FF}+k(V_{FB})$ is provided to the electric machine, where $0 \leq k < 1$ and where $|V_{FF}+k(V_{FB})| = V_{bus}$.

In another embodiment, a control system for an electric machine with a maximum bus value $V_{bus}$ is provided. The control system is configured to determine a feedforward vector ($V_{FF}$), determine a feedback vector ($V_{FB}$), determine a first convex boundary centered at an origin, wherein a minimum distance from the first convex boundary to the origin is equal to $V_{bus}$ and wherein a shape of the first convex boundary is determined by overmodulation provided by the control system, and determine a second convex boundary, wherein the second convex boundary is centered at the origin, and lies entirely on or within the first convex boundary, wherein when a vector sum ($V_{FF}+V_{FB}$) lies inside the first convex boundary providing a control vector of $V_{FF}+V_{FB}$ to the electric machine, and wherein when the vector sum ($V_{FF}+V_{FB}$) lies outside the first convex boundary then providing a scaled $V_{FF}$ of $k_1 V_{FF}$ where $k_1 = 1$ if the vector $V_{FF}$ lies on or inside the second convex boundary and where $0 < k_1 < 1$ if $V_{FF}$ lies outside the second convex boundary, wherein $k_1 V_{FF}$ lies on the second convex boundary, and if a vector sum $k_1 V_{FF}+V_{FB}$ lies outside the first convex boundary, then providing a scaled $V_{FB}$ of $k_2 V_{FB}$, where $k_1 V_{FF}+k_2 V_{FB}$ lies on the first convex boundary and $0 \leq k_2 < 1$, and providing the vector sum $k_1 V_{FF}+V_{FB}$ to the electric machine when vector sum $k_1 V_{FF}+V_{FB}$ lies inside the first convex boundary and providing the vector sum $k_1 V_{FF}+k_2 V_{FB}$ to the electric machine when vector sum $k_1 V_{FF}+V_{FB}$ lies outside the first convex boundary.

In another embodiment, a method for controlling an electric machine by an inverter controller arranged to direct a power converter, wherein the electric machine has a maximum bus voltage $V_{bus}$ is provided. A feedforward vector ($V_{FF}$) is determined. A feedback vector ($V_{FB}$) is determined. A first convex boundary centered at an origin is determined, where a minimum distance from the first convex boundary to the origin is equal to $V_{bus}$ and where a shape of the first convex boundary is determined by overmodulation provided by the control system. A second convex boundary is determined, where the second convex boundary is centered at the origin and lies entirely on or within the first convex boundary. Whether a vector sum ($V_{FF}+V_{FB}$) lies outside the first convex boundary is determined. When a vector sum ($V_{FF}+V_{FB}$) lies inside the first convex boundary, a control vector of $V_{FF}+V_{FB}$ is provided to the electric machine. When the vector sum ($V_{FF}+V_{FB}$) lies outside the first convex boundary then a scaled $V_{FF}$ of $k_1 V_{FF}$ where $k_1 = 1$ is provided if the vector $V_{FF}$ lies on or inside the second convex boundary and where $0 < k_1 < 1$ if $V_{FF}$ lies outside the second convex boundary where $k_1 V_{FF}$ lies on the second convex boundary. Whether a vector sum $k_1 V_{FF}+V_{FB}$ lies outside the first convex boundary is determined, where if the vector sum $k_1 V_{FF}+V_{FB}$ lies outside the first convex boundary, providing a scaled $V_{FB}$ of $k_2 V_{FB}$, where $k_1 V_{FF}+k_2 V_{FB}$ lies on the first convex boundary and $0 \leq k_2 \leq 1$; and providing the vector sum $k_1 V_{FF}+V_{FB}$ to the electric machine when vector sum $k_1 V_{FF}+V_{FB}$ lies inside the first convex boundary and providing the vector sum $k_1 V_{FF}+k_2 V_{FB}$ to the electric machine when vector sum $k_1 V_{FF}+V_{FB}$ lies outside the first convex boundary.

These and other features of the present disclosure will be described in more detail below in the detailed description of the disclosure and in conjunction with the following figures.

BRIEF DESCRIPTION OF THE DRAWINGS

The invention and the advantages thereof may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Modern electric machines have relatively high energy conversion efficiencies. The energy conversion efficiency of most electric machines, however, can vary considerably based on their operational load. With many applications, a machine is required to operate under a wide variety of different operating load conditions. In addition, the torque provided by an electric machine may vary over operation requiring a variation from a first torque to a second torque. The first torque may be a first torque level and the second torque may be a second torque level.

Controllers for electric machines may use feedforward control signals and feedback control signals. Feedforward controlling signals are provided controlling signals are typically not derived from measuring an error, but instead may be provided by an external operator. A feedback control signal is typically generated by measuring an error between an actual output and a desired output.

Figure 1:
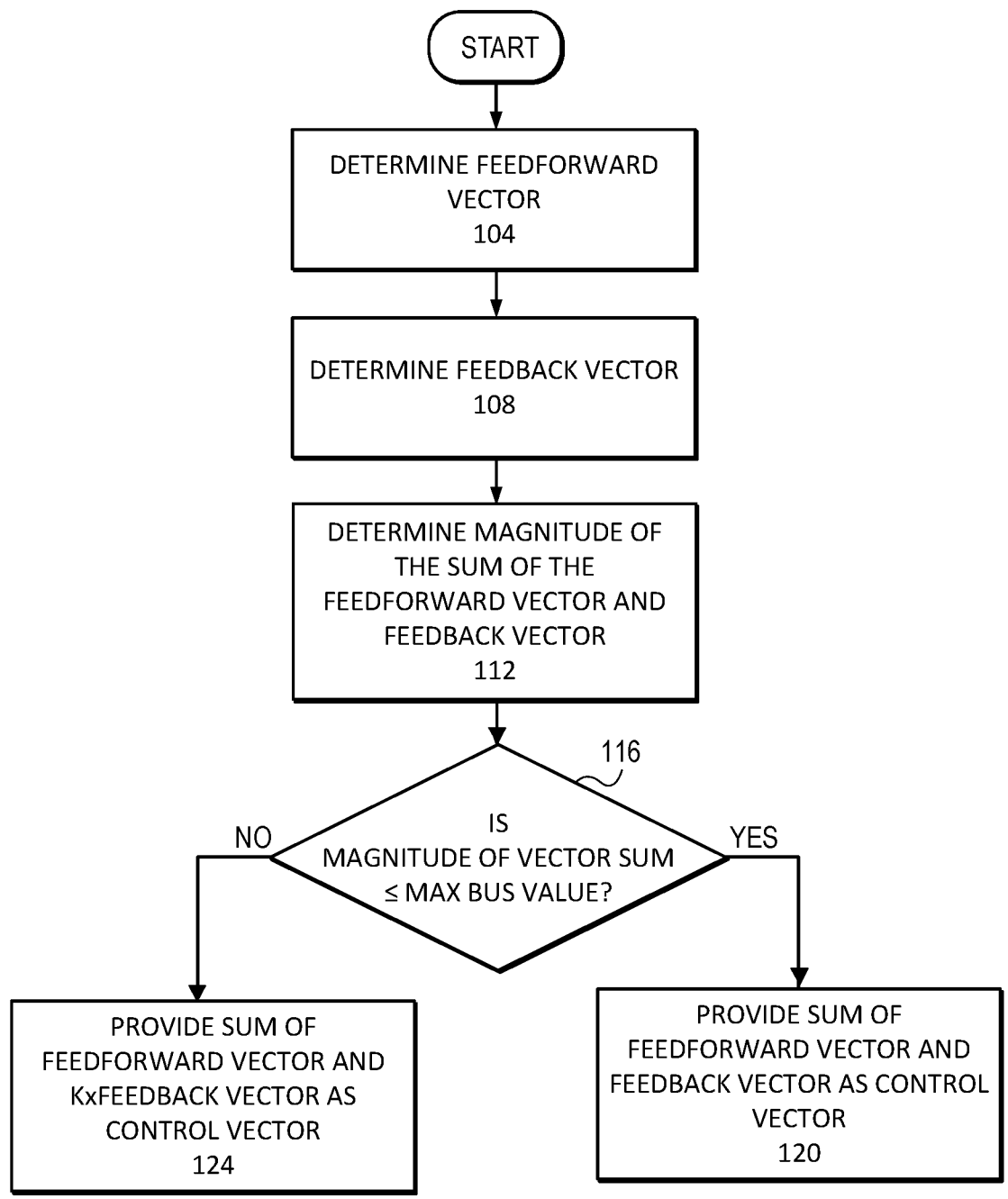
FIG. 1 is a high level flow chart that is used in some embodiments.
Figure 2:
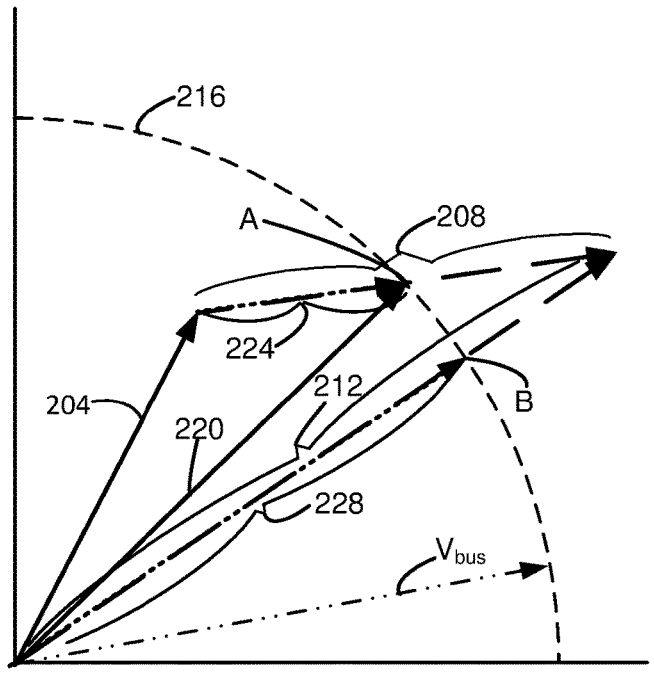
FIG. 2 is a vector diagram illustrating a process in accordance with some embodiments.

To facilitate understanding, FIG. 1 is a high level flow chart that may be used in some embodiments. A feedforward vector is determined (step 104). In some embodiments, a control system of an electric machine is configured to determine the feedforward vector. FIG. 2 is a schematic illustration of the implementation used in some embodiments. In some embodiments, the feedforward vector ($V_{FF}$) 204 is at least one of a feedforward voltage vector, feedforward current vector, and feedforward force vector. $V_{FF}$ 204 has a magnitude and an angle.

A feedback vector is determined (step 108). In FIG. 2, the feedback vector ($V_{FB}$) 208 is at least one of a feedback voltage vector, feedback current vector, and feedback force vector. $V_{FB}$ 208 has a magnitude and an angle. The magnitude of the sum of the feedforward vector and the feedback vector is determined (step 112). In FIG. 2, the sum of $V_{FF}$ 204 and $V_{FB}$ 208 is shown as $V_{SUM}$ 212 and is determined in FIG. 2 using head to tail vector addition. In this example, $V_{SUM}$ 212 has a magnitude and angle that is different from the magnitudes and angles of both $V_{FF}$ 204 and $V_{FB}$ 208. Various known processes may be used to determine the angle and magnitude of $V_{SUM}$ 212.

A comparison is made between the magnitude of $V_{SUM}$ 212 and a maximum bus value ($V_{bus}$) (step 116). If the magnitude of $V_{SUM}$ 212 is less than or equal to the maximum bus value $V_{bus}$, then $V_{SUM}$ 212 is provided as a control vector to the electric machine (step 124). In some embodiments, the maximum bus value is at least one of a maximum bus voltage value, maximum bus current value, and maximum bus force value. In FIG. 2, the magnitude of $V_{bus}$ forms a section of a circle 216 defined by a radius $V_{bus}$. In the example, shown in FIG. 2, $V_{SUM}$ 212 extends past the maximum bus value section of a circle 216, therefore the magnitude of $V_{SUM}$ 212 is greater than $V_{bus}$. Therefore, in some embodiments, a new control vector is calculated according to the equation $V_{control} = V_{FF} + k(V_{FB})$, where k is a scalar value between 0 and 1, inclusive, and where $V_{control}$ 220 has a magnitude equal to $V_{bus}$ and an angle different from the angle of $V_{SUM}$ 212, as shown in FIG. 2. FIG. 2 shows vector $k(V_{FF})$ 224. In FIG. 2, $V_{control}$ 220 extends to point A. In these embodiments, $V_{control}$ 220 is provided as the control vector.

In the prior art, when the magnitude of $V_{SUM}$ is greater than $V_{bus}$ a control vector of $V_{prior}$ 228=$k(V_{SUM})$, where k is a scalar value between 0 and 1 would be used as the control vector. $V_{prior}$ 228 would have a magnitude equal to $V_{bus}$ and an angle equal to the angle of $V_{SUM}$ 212, as shown in FIG. 2. In FIG. 2, $V_{prior}$ 228 extends to point B.

It has been found that using $V_{control}$ 220 as a control vector provides improved control compared to using $V_{prior}$ 228 as a control vector. $V_{control}$ 220 maintains the angle between $V_{FF}$ 204 and $V_{FB}$ 208, whereas $V_{prior}$ 228 changes the angle between $V_{FF}$ 204 and $V_{FB}$ 208. Maintaining the angle between $V_{FF}$ 204 and $V_{FB}$ 208 allows the resulting change to be along a more predictable profile. By using $V_{control} = V_{FF} + k(V_{FB})$, where k is a scalar value between 0 and 1, inclusive, and where $V_{control}$ 220 has a magnitude equal to $V_{bus}$, the correction provided is in the same direction as the intended correction $V_{FB}$ 208 and is as much as possible given the limitation of not exceeding $V_{bus}$. Such a correction would provide a more direct correction path. Changing angles between $V_{FF}$ 204 and $V_{FB}$ 208 introduces control errors since changing the angle causes either influence from $V_{FF}$ 204 or $V_{FB}$ 208 in a less predictable manner. Changing the angle impairs convergence, increasing the time needed for cleaning up errors introduced by going in the wrong direction. In some embodiments, the clean up for going in the wrong direction may result in a feedback loop that slowly converges to a correct solution. The slow convergence increases inefficiency.

By setting the magnitude of $V_{control}$ to be equal to $V_{bus}$, k may be determined by solving a quadratic equation. In some embodiments, $V_{FF}$ 204=(a,b) and $V_{FB}$ 208=(c,d) and $V_{bus}$=R, so that $$k = [-(ac+bd) + \sqrt{2abcd - a^2d^2 - b^2c^2 + (c^2+d^2)R^2}]/(c^2+d^2)$$

Figure 3:
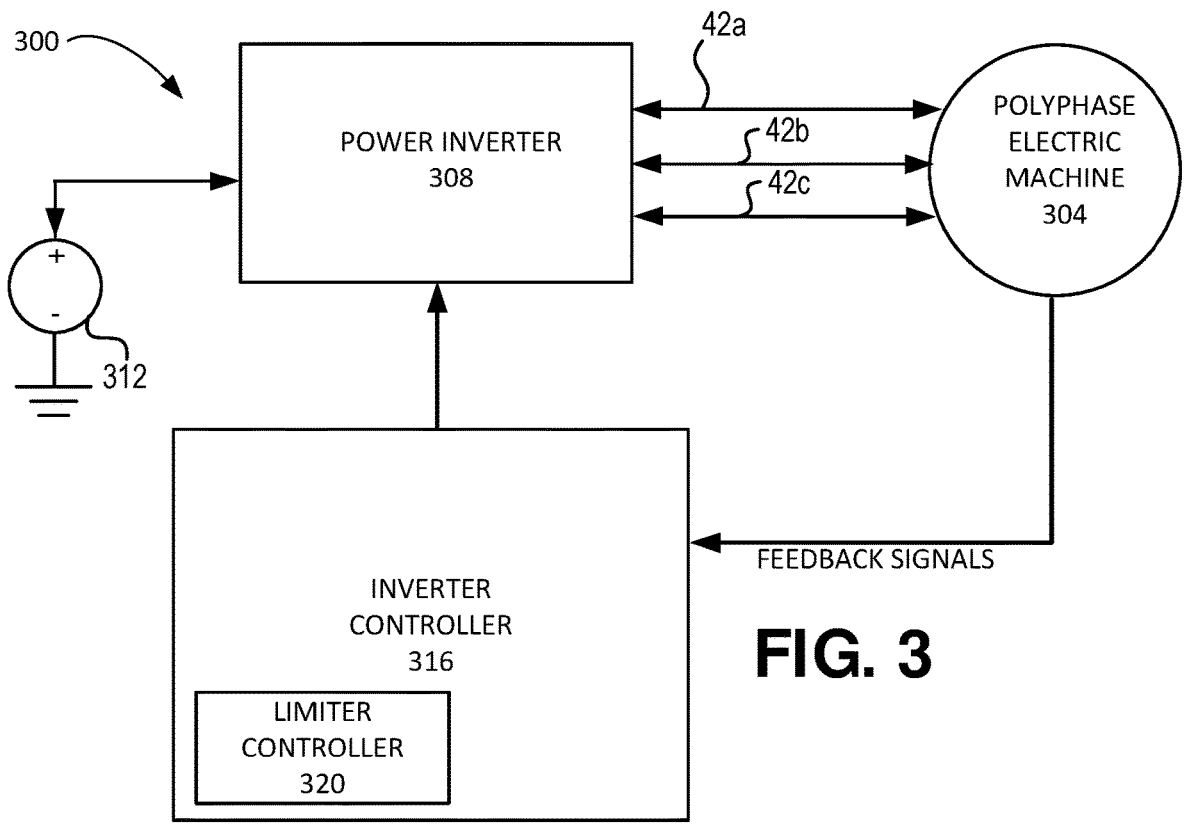
FIG. 3 is a schematic view of an electric machine in accordance with some embodiments with a pulsed torque.

Various embodiments may be used in various electric machines. To facilitate understanding, FIG. 3 is a block diagram of an electric machine system 300 that may be used in some embodiments. The electric machine system 300 comprises a polyphase electric machine 304, a power inverter 308, a power source 312, and an inverter controller 316. In the specification and claims, the polyphase electric machine 304 may be a polyphase motor or a polyphase generator. Therefore, in the specification and claims, the power inverter 308 is a power converter for either a polyphase motor or a polyphase generator. Such a power inverter 308 may also be called a power rectifier. In some embodiments, the power source 312 is a DC power source. One or more feedback signals are provided from the polyphase electric machine 304 to the inverter controller 316. In some embodiments, the inverter controller comprises a limiter controller 320.

In some embodiments, the inverter controller 316 may be located within the power inverter 308. In some embodiments, the inverter controller 316 may be outside of or separate from the power inverter 308. In some embodiments, part of the inverter controller 316 may be within the power inverter 308 and part of the inverter controller 316 may be outside of or separate from the power inverter 308. In some embodiments, the inverter controller 316 provides switching signals to the power inverter 308. In some embodiments, the limiter controller 320 may be located within the inverter controller 316. In some embodiments, the limiter controller 320 may be outside of or separate from the inverter controller 316. In some embodiments, part of the limiter controller 320 may be within the inverter controller 316 and part of the limiter controller 320 may be outside of or separate from the inverter controller 316. In some embodiments, the limiter controller 320 provides $V_{control}$ 220 to the inverter controller 316. The limiter controller 320 described herein may be implemented in a wide variety of different manners including using software or firmware executed on a processing unit such as a microprocessor, using programmable logic, using application specific integrated circuits (ASICs), using discrete logic, etc., and/or using any combination of the foregoing.

In some embodiments, where the polyphase electric machine 304 is operated as a 3 phase motor, the power inverter 308 is responsible for generating three-phase AC power from the DC power supply 312 to drive the polyphase electric machine 304. The three-phase input power, denoted as phase A 42a, phase B 42b, and phase C 42c, is applied to the windings of the stator of the polyphase electric machine 304 for generating a rotating magnetic field. The lines depicting the various phases, 42a, 42b, and 42c are depicted with arrows on both ends indicating that current can flow both from the power inverter 308 to the polyphase electric machine 304 when the machine is used as a three-phase motor and that current can flow from the polyphase electric machine 304 to the power inverter 308 when the polyphase electric machine 304 is used as a generator. When the polyphase electric machine 304 is operating as a generator, the power inverter 308 operates as a power rectifier, and the AC power coming from the polyphase electric machine 304 is converted to DC power being stored in the DC power supply 312.

Figure 4:
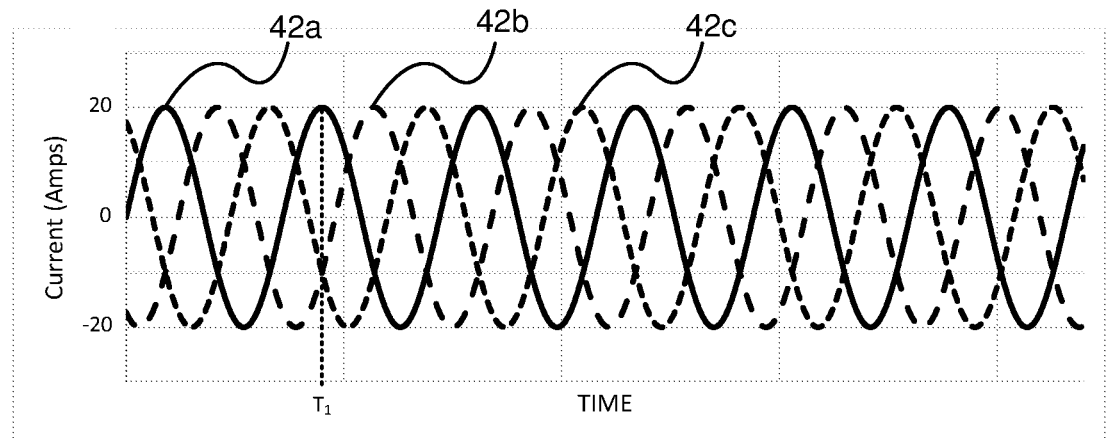
FIG. 4 is a diagrammatic representation of a continuous three-phase AC waveform.

FIG. 4 illustrates conventional sinusoidal three-phase current 42a, 42b, and 42c delivered to/produced by the polyphase electric machine 304 during excitation used in some embodiments. Phase B, denoted by curve 42b, lags phase A, denoted by 42a, by 120 degrees. Phase C, denoted by curve 42c, lags phase B by 120 degrees. The three-phased current 42a, 42b, and 42c is continuous (not pulsed) and has a designated amplitude of approximately 20 amps. It should be appreciated that 20 amps are only a representative current amplitude, and the current amplitude may have any value. In an example, a first phase current 42a may provide phase A 42a, the second phase current 42b may provide phase B 42b, and the third phase current 42c may provide phase C 42c. In some embodiments, a three-phase voltage may be provided instead of a three-phase current.

Figure 5:
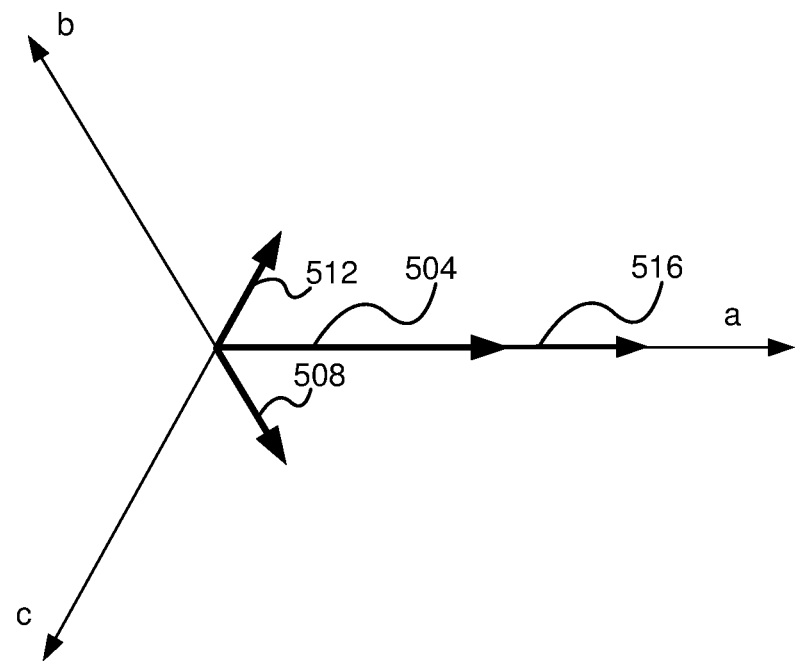
FIG. 5 illustrates a three-phase power representation in an abc frame of reference that may be used in some embodiments.

Some embodiments may use an abc frame of reference. FIG. 5 illustrates a three-phase power representation in an abc frame of reference that may be used in some embodiments. FIG. 5 shows axis a, axis b, and axis c that are 120° apart. In some embodiments, the current or voltage shown by curve 42a is shown along axis a, the current or voltage shown by curve 42b is shown along axis b, and the current or voltage shown by curve 42c is shown along axis c. For example, at $T_1$ shown in FIG. 4, curve 42a is at a positive maximum and curves 42b and 42c are at equal negative values. Therefore, curve 42a provides current or voltage vector $V_a$ 504, curve 42b provides current or voltage vector $V_b$ 508, and curve 42c provides current or voltage vector $V_c$ 512. The sum of $V_a+V_b+V_c=V_{Tot}$ 516. In the example shown in FIG. 4, the magnitude of $V_{Tot}$ 516 will be constant a will rotate in a counter-clockwise direction around the origin. In some embodiments, $V_{Tot}$ 516 is designated as a space vector. V-rot 516.

Figure 6:
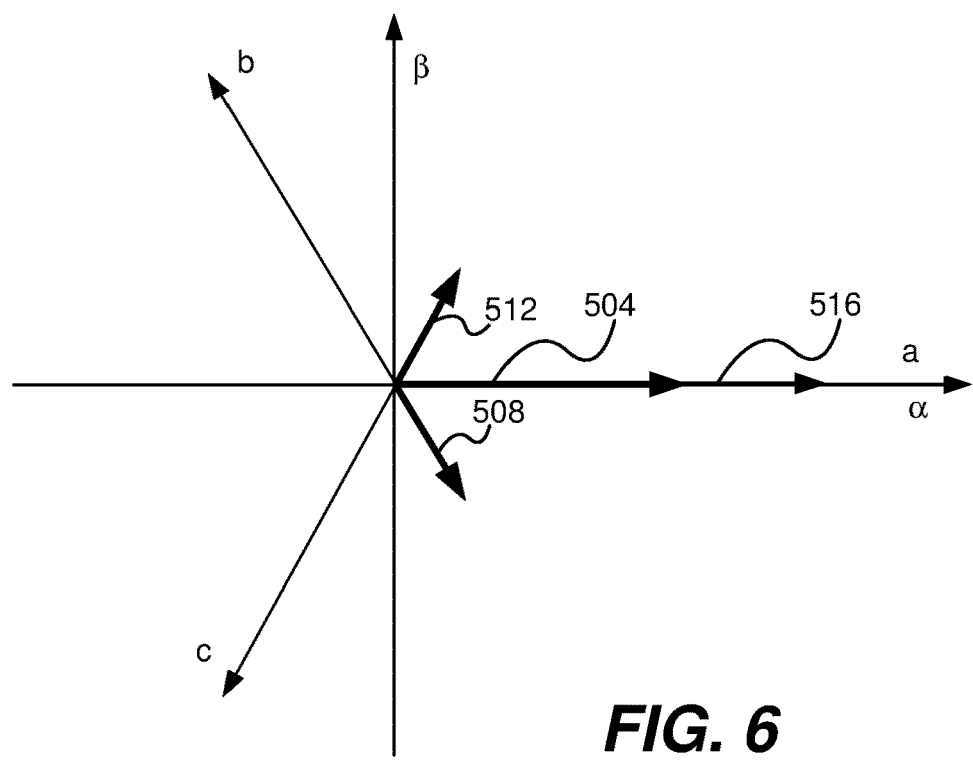
FIG. 6 illustrates a three-phase power representation in an αβ frame of reference that may be used in some embodiments.

Some embodiments may use an αβ frame of reference. FIG. 6 illustrates a three-phase power representation in an αβ frame of reference that may be used in some embodiments. The a-axis, b-axis, and c-axis that are 120° apart as shown in FIG. 5 are replaced by two orthogonal axes called axis α and axis β, as shown. Instead, of describing current or voltage vector $V_a$ 504, current or voltage vector $V_b$ 508, and current or voltage vector $V_c$ 512 using three axes, the same vectors may be described using two coordinates of the two orthogonal axes, axis α and axis β. In addition, $V_{Tot}$ 516 can be described using two coordinates. In the example shown in FIG. 4 at time $T_1$, the magnitude of $V_{Tot}$ 516 will be constant and will rotate in a counter-clockwise direction around the origin. Coordinates in the abc frame of reference may be transformed to or from coordinates of the αβ frame of reference using the direct Clarke Transformation or the Inverse Clarke transformation.

Some embodiments may use the dq frame of reference. In the dq frame of reference, there are two orthogonal axes, which are the direct (d) axis and the quadrature (q) axis. The αβ frame of reference is a static or stationary frame of reference that coincides with a static or stationary stator. The dq frame of reference is a rotating frame of reference that rotates with the rotor. A Park Transformation may be used to transform coordinates from the αβ frame of reference to the dq frame of reference. In the example shown in FIG. 4 at time $T_1$, current or voltage vector $V_d$ along the rotating d axis and current or voltage vector $V_q$ along the rotating orthogonal q axis are constant. $V_d+V_q=V_{Tot}$, which would also be constant and stationary in the rotating dq frame of reference but would be rotating when transformed into a stationary frame of reference.

Figure 7:
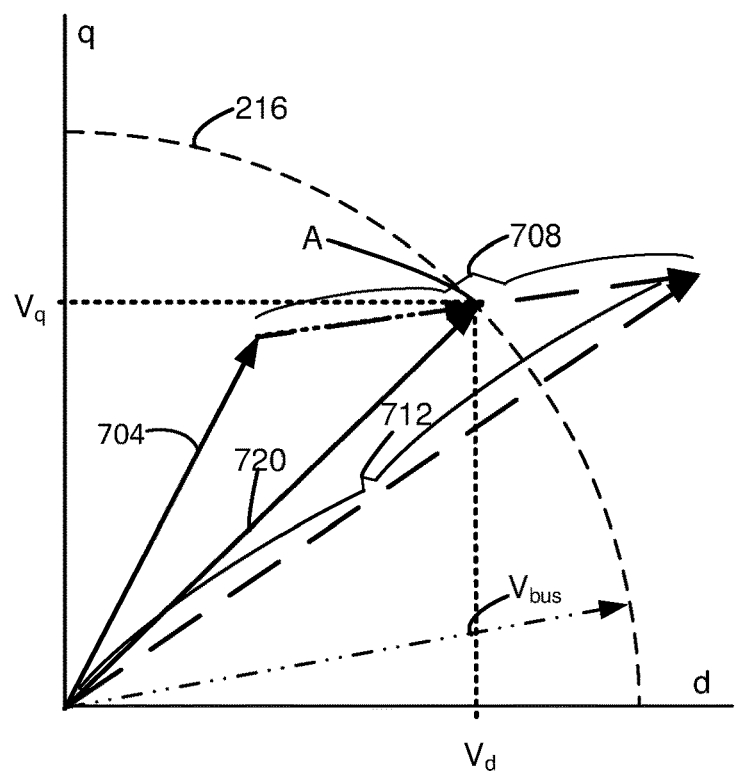
FIG. 7 illustrates a three-phase power representation in a dq frame of reference that may be used in some embodiments.

FIG. 7 illustrates a three-phase power representation in a dq frame of reference with a d axis and an orthogonal q axis. At some times $V_{Tot}$ 704 is a constant vector since the dq frame of reference rotates with the rotor. In some embodiments, $V_{Tot}$ 704 is the same as $V_{FF}$ 204, shown in FIG. 2. $V_{Tot}$ 704 is used to maintain the equilibrium (or current state) of the electric machine in order to provide a constant output, such as constant torque. In order to change the torque output of the electric machine, the current or voltage provided to the electric machine must be changed. In some embodiments, the change in the current or voltage in order to change the force provided by the electric machine to a target force is represented by $V_{FB}$ 708, which may be the same as $V_{FB}$ 208, shown in FIG. 2. In some embodiments, $V_{FB}$ 208 is proportional to a desired current derivative vector term $dI_{dq}/dt$. In some embodiments, $V_{SUM}$ 712 is defined as being equal to $V_{Tot}$ 704+$V_{FB}$ 708. If the magnitude of $V_{SUM}$ 712 is greater than the amount of power that can be handled by the electric machine $V_{bus}$, then, for the reasons explained above, some embodiments provide a power vector $V_{control}$ 720 defined by the equation, $V_{control}=V_{Tot}+k(V_{FB})$, where k is a value between 0 and 1, inclusive, and where $V_{control}$ 720 has a magnitude equal to $V_{bus}$. $V_{control}$ 720 provides $V_d$, which is the d component of $V_{control}$ 720, and $V_q$, which is the q component of $V_{control}$ 720.

In some embodiments, the electric machine system 300, shown in FIG. 3, may have an improved efficiency by being a pulsed electric machine system. Examples of such pulsed torque electric machines are described in U.S. Pat. No. 10,742,155 filed on Mar. 14, 2019, U.S. patent application Ser. No. 16/353,159 filed on Mar. 14, 2019, and U.S. Provisional Patent Application Nos. 62/644,912, filed on Mar. 19, 2018; 62/658,739, filed on Apr. 17, 2018; and 62/810,861 filed on Feb. 26, 2019. Each of the foregoing applications or patents is incorporated herein by reference for all purposes in their entirety. In such applications, the torque level transitions occur very frequently (potentially many times a second) and efficient transition control enables even higher efficiency operation. In addition, in some embodiments of pulsed electric machine systems where efficiency is most important, fast transitions are more important than a smooth transition.

In some embodiments, the fast pulsing provides higher efficiency. In some embodiments in order to provide fast pulsing, a large $V_{FB}$ is used causing the magnitude of $V_{SUM}$ 712 to be greater than $V_{bus}$. In such instances, $V_{control}=V_{Tot}+k(V_{FB})$, where $0 \leq k<1$ and where $V_{control}$ 720 has a magnitude equal to $V_{bus}$ is used. Since the use of $V_{control}$ 720 improves control when compared to the prior art, the use of $V_{control}$ 720 in a pulsed situation improves control for pulsed electric machines.

In some embodiments, $V_{FF}$ 204 is pre-limited by the limiter controller 320 to be no greater than $V_{bus}$. Such a prelimit ensures a real solution for k. In other embodiments, $V_{FF}$ 204 is pre-limited to be no greater than $F*V_{bus}$, where F is in the range of 0.5 to 0.99. In some embodiments, F is in the range of 0.8 to 0.99. In some embodiments, F is in the range of 0.8 and 0.9. By limiting $V_{FF}$ 204 to be less than $V_{bus}$, k is greater than 0, allowing for some influence by $V_{FB}$ 208.

Some embodiments are used in electric machine systems that use a pulsed operation to improve efficiency. An example of an electrical machine that uses a pulsed operation is described in U.S. Pat. No. 10,742,155, issued Aug. 11, 2020, to Adya S. Tripathi, which is incorporated by reference for all purposes. Pulsed electric machine control is described in U.S. Pat. No. 10,944,352; U.S. Pat. No. 11,077,759; U.S. Pat. No. 11,088,644; U.S. Pat. No. 11,133,767; U.S. Pat. No. 11,167,648; and U.S. patent application Ser. No. 16/912,313 filed Jun. 25, 2020, which are incorporated by reference for all purposes. In some embodiments, such pulsed operation continuously changes electric machine operation and requires a high rate of change. As a result, in some embodiments, the pulsed operation has a large $V_{FB}$. So, in some embodiments of a pulsed operation electric machine uses a large $V_{FB}$. Therefore, some embodiments provide improved pulsed operation.

Figure 8:
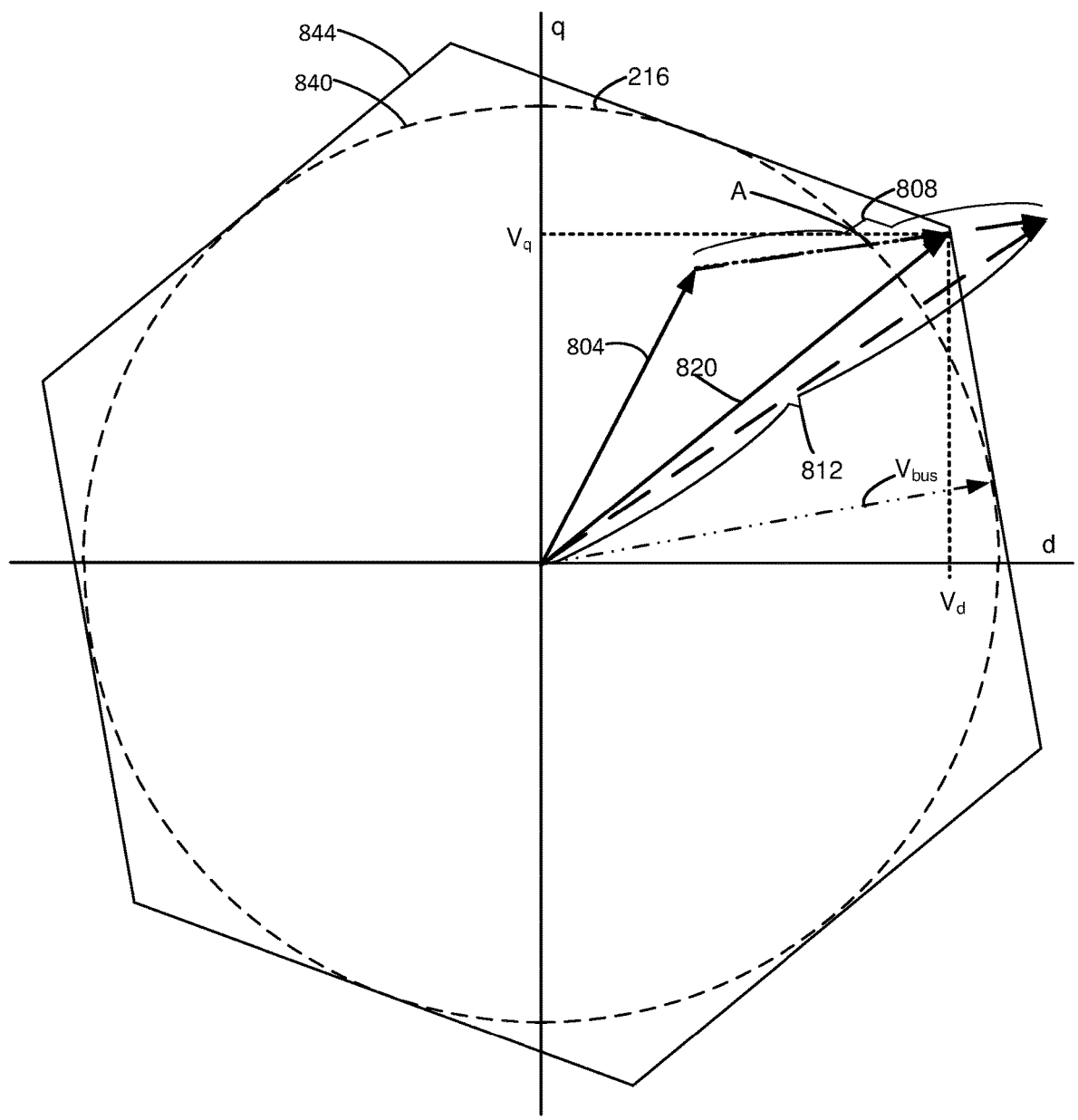
FIG. 8 illustrates a three-phase power representation of a feedforward vector and a feedback vector in a dq frame of reference that may be used in some embodiments.

In some electric machines, overmodulation may be used to increase the output voltage supplied to the motor. Overmodulation is a method of increasing the output voltage that can be supplied to a multiphase motor by allowing distortion of the output voltages. FIG. 8 is a schematic illustration of an embodiment with overmodulation. A circle 840 with a radius of $V_{bus}$ shows the maximum bus value that can be provided by the electric machine controller without overmodulation. A hexagon 844 shows overmodulation values that are provided, where the overmodulation values are the distance from the origin to the hexagon 844 so that the overmodulation defines the hexagon 844. The hexagon 844 shows that the overmodulation values vary over time. The hexagon 844 is a first convex boundary centered at the origin with a minimum distance from the origin of the maximum bus value $V_{bus}$. The circle 840 is a second convex boundary centered at the origin that is entirely on or within the second convex boundary.

At some times, the feedforward vector $V_{FF}$ 804 is a constant vector since the dq frame of reference rotates with the rotor. The feedforward vector $V_{FF}$ 804 is used to maintain the equilibrium (or current state) of the electric machine in order to provide a constant output, such as constant torque. In order to change the torque output of the electric machine, the current or voltage provided to the electric machine must be changed. In some embodiments, the change in the current or voltage in order to change the force provided by the electric machine to a target force is represented by the feedback vector $V_{FB}$ 808. In some embodiments, $V_{FB}$ 808 is proportional to a desired current derivative vector term $dI_{dq}/dt$. In some embodiments, $V_{SUM}$ 812 is defined as being equal to $V_{FF}$ 804+$V_{FB}$ 808. If $V_{SUM}$ 812 lies outside of the first convex boundary defined by hexagon 844, some embodiments provide a power vector $V_{control}$ 820 defined by the equation, $V_{control}=V_{FF}+k(V_{FB})$, where k is a value between 0 and 1, inclusive, and where $V_{control}$ 820 lies on the first convex boundary. $V_{control}$ 820 provides $V_d$, which is the d component of $V_{control}$ 820, and $V_q$, which is the q component of $V_{control}$ 820.

Figure 9:
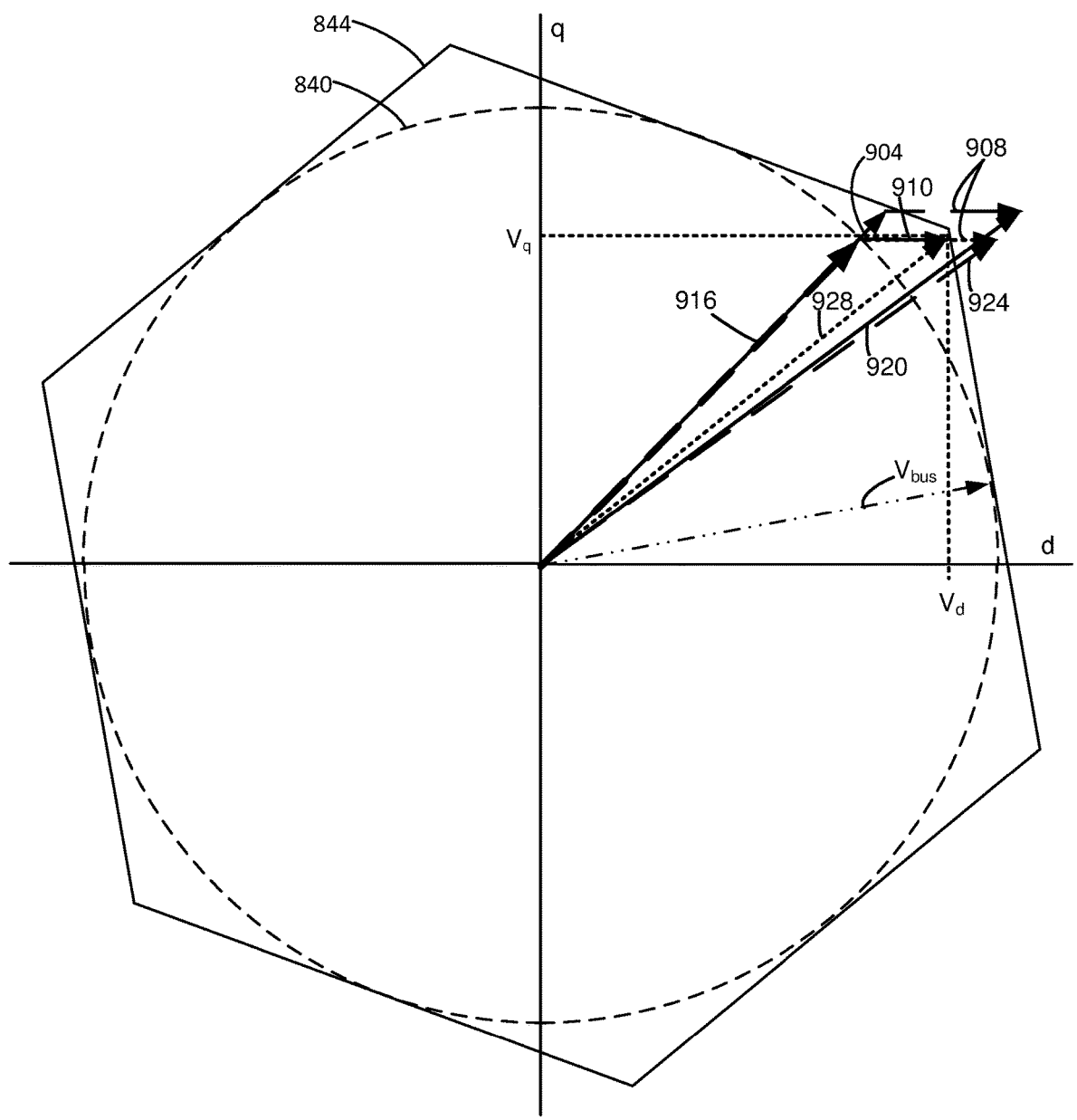
FIG. 9 illustrates a three-phase power representation of a feedforward vector and a feedback vector in a dq frame of reference that may be used in some embodiments.

FIG. 9 is a schematic illustration of the embodiment with overmodulation where $V_{FF}$ 904 lies outside of the second convex boundary defined by the circle 840 and where $V_{SUM}$ 912 is defined as being equal to $V_{FF}$ 904+$V_{FB}$ 908 lies outside of the first convex boundary defined by the hexagon 844. In such a case, $V_{FF}$ 904 is scaled back by multiplying $V_{FF}$ 904 by a constant $k_1$ between 0 and 1 so that $k_1V_{FF}$ 916 lies on the second convex boundary defined by the circle 840. If the new sum of ($k_1V_{FF}$ 916+$V_{FB}$ 908) 924 lies outside the of the first convex boundary defined the hexagon 844, $V_{FB}$ 908 is scaled back by multiplying $V_{FB}$ 908 by a constant $k_2$ between 0 and 1 so that ($k_1V_{Tot}$ 916+$k_2V_{FB}$ 910) 928 lies on the second convex boundary defined by the hexagon 844.

In some embodiments, when there is no overmodulation, the first convex boundary and the second convex boundary are the same. So, the second convex boundary is determined by overmodulation by providing no overmodulation. In some embodiments, the second convex boundary is equal to the first convex boundary scaled according to a factor F, where F is in a range between 0.8 and 1 inclusive. In some embodiments, the first convex boundary and the second convex boundary are regular polygons or circles. In some embodiments, the first convex boundary is a regular polygon and the second convex boundary is a circle. In some embodiments, both the first convex boundary and the second convex boundary are regular polygons.

A general process that incorporates the above embodiments would determine a feedforward vector ($V_{FF}$) and would determine a feedback vector ($V_{FB}$). The feedforward vector ($V_{FF}$) is the same as $V_{Tot}$. The feedforward vector ($V_{FF}$) and the feedback vector ($V_{FB}$) may be defined in a αβ frame of reference or a dq frame of reference, where the intersections of the axes define an origin. Although the electric machine has a maximum bus value ($V_{bus}$), when overmodulation is provided, a limiting modulated value (V mod) is determined by the amount of overmodulation provided, which is indicated by the modulation indice. The overmodulation defines a first convex boundary that is centered at the origin, where a distance from the origin to the first convex boundary is the limiting modulated value (V mod). The minimum distance from the origin to the first convex boundary is the maximum bus value ($V_{bus}$). The maximum bus value ($V_{bus}$) is used to define a second convex boundary that is centered at the origin. The second convex boundary is within or on the first convex boundary. In some embodiments, the second convex boundary is circumscribed by the first convex boundary. In some embodiments, where there is no overmodulation, the second convex boundary is the same as the first convex boundary. In some embodiments, the second convex boundary has a distance from the origin that is less than the maximum bus value ($V_{bus}$) where the second convex boundary lies entirely on or within the first convex boundary. In some embodiments, the distance from the origin to the second convex boundary is equal to F times the first convex boundary, where F is in a range between 0.8 and 1.

If the vector sum ($V_{FF}+V_{FB}$) lies on or inside the first convex boundary then a control vector of $V_{FF}+V_{FB}$ is provided to the electric machine. If the vector sum ($V_{FF}+V_{FB}$) lies outside the first convex boundary then a scaled $V_{FF}$ of $k_1 V_{FF}$ is provided where k 1=1 if the vector $V_{FF}$ lies on or inside the second convex boundary and where $0<k_1<1$ if $V_{FF}$ lies outside the second convex boundary, where $k_1 V_{FF}$ lies on the second convex boundary. If the vector sum ($k_1 V_{FF}+V_{FB}$) lies outside the first convex boundary, then a scaled $V_{FB}$ of $k_2 V_{FB}$ is provided where $k_1 V_{FF}+k_2 V_{FB}$ lies on the first convex boundary and $0 \leq k_2 \leq 1$. The vector sum $k_1 V_{FF}+V_{FB}$ is provided to the electric machine when the vector sum $k_1 V_{FF}+V_{FB}$ lies inside the first convex boundary. The vector sum $k_1 V_{FF}+k_2 V_{FB}$ is provided to the electric machine when the vector sum $k_1 V_{FF}+V_{FB}$ lies outside the first convex boundary.

In various embodiments, polyphase machines may include but are not limited to brushless DC (BLDC) machines, permanent magnet synchronous machines (PMSM), interior permanent magnet (IPM) machines, wound rotor synchronous machines, induction machines, and synchronous reluctance machines. In some embodiments, the polyphase machine may have two or more phases. As mentioned above, polyphase machines may be polyphase motors or polyphase generators, or polyphase machines that operate both as motors and generators.

While this disclosure has been described in terms of several preferred embodiments, there are alterations, modifications, permutations, and various substitute equivalents, which fall within the scope of this disclosure. It should also be noted that there are many alternative ways of implementing the methods and apparatuses of the present disclosure. It is therefore intended that the following appended claims be interpreted as including all such alterations, modifications, permutations, and various substitute equivalents as fall within the true spirit and scope of the present disclosure. As used herein, the phrase "A, B, or C" should be construed to mean a logical ("A OR B OR C"), using a non-exclusive logical "OR," and should not be construed to mean 'only one of A or B or C. Each step within a process may be an optional step and is not required. Different embodiments may have one or more steps removed or may provide steps in a different order. In addition, various embodiments may provide different steps simultaneously instead of sequentially. In addition, elements that are shown and described separately may also be combined in a single device or single step. For example, steps that are described sequentially may be simultaneous. In addition, steps described sequentially in one order may be performed in another order.

What is claimed is:

1. A control system for an electric machine, wherein the electric machine has a maximum bus value ($V_{bus}$), wherein the control system is configured to:
   determine a feedforward vector ($V_{FF}$);
   determine a feedback vector ($V_{FB}$);
   compare a magnitude of a sum of the feedforward vector and feedback vector ($|V_{FF}+V_{FB}|$) and the maximum bus value ($V_{bus}$);
   when $|V_{FF}+V_{FB}| \leq V_{bus}$, providing a control vector of $V_{FF}+V_{FB}$ to the electric machine; and
   when $|V_{FF}+V_{FB}| > V_{bus}$, providing a control vector of $V_{FF}+k(V_{FB})$ to the electric machine, where $0 \leq k < 1$ and where $|V_{FF}+k(V_{FB})|=V_{bus}$.

2. The control system, as recited in claim 1, wherein the feedforward vector is at least one of a feedforward voltage vector, feedforward current vector, and feedforward force vector and wherein the feedback vector is at least one of a feedback voltage vector, feedback current vector, and feedback force vector and wherein the maximum bus value is at least one of maximum bus voltage value, maximum bus current value, and maximum bus force value.

3. The control system, as recited in claim 1, wherein the feedforward vector is a vector in a dq frame of reference indicating a current state of an electric machine and the feedback vector is a vector in a dq frame of reference indicating a direction of change for the electric machine.

4. The control system, as recited in claim 1, wherein the control system is arranged to direct a power converter to cause a pulsed operation of an electric machine.

5. The control system, as recited in claim 1, wherein the control system is configured to prelimit the feedforward vector ($V_{FF}$) to be less than or equal to $V_{bus}$.

6. The control system, as recited in claim 1, wherein the control system is configured to prelimit the feedforward vector ($V_{FF}$) to be less than or equal to $F*V_{bus}$, wherein F is in a range of 0.8 to 0.99.

7. The control system, as recited in claim 1, wherein the electric machine is a polyphase machine.

8. A system comprising:
   an electric machine;
   a power converter; and
   a control system, wherein the electric machine has a maximum bus value ($V_{bus}$), wherein the control system is configured to:
      determine a feedforward vector ($V_{FF}$);
      determine a feedback vector ($V_{FB}$);
      compare a magnitude of a sum of the feedforward vector and feedback vector ($|V_{FF}+V_{FB}|$) and the maximum bus value ($V_{bus}$);
      when $|V_{FF}+V_{FB}| \leq V_{bus}$, providing a control vector of $V_{FF}+V_{FB}$ to the electric machine; and when $|V_{FF}+V_{FB}|>V_{bus}$ providing a control vector of $V_{FF}+k(V_{FB})$ to the electric machine, where $0\leq k<1$ and where $|V_{FF}+k(V_{FB})|=V_{bus}$.

9. The system, as recited in claim 8, wherein the feedforward vector is at least one of a feedforward voltage vector, feedforward current vector, and feedforward force vector and wherein the feedback vector is at least one of feedback voltage vector, feedback current vector, and feedback force vector and wherein the maximum bus value is at least one of maximum bus voltage value, maximum bus current value, and maximum bus force value.

10. The system, as recited in claim 8, wherein the feedforward vector is a vector in a dq frame of reference indicating a current state of an electric machine and the feedback vector is a vector in a dq frame of reference indicating a direction of change for the electric machine.

11. The system, as recited in claim 8, wherein the system is arranged to direct a power converter to cause a pulsed operation of an electric machine.

12. The system, as recited in claim 8, wherein the system is configured to prelimit the feedforward vector ($V_{FF}$) to be less than or equal to $V_{bus}$.

13. The system, as recited in claim 8, wherein the system is configured to prelimit the feedforward vector ($V_{FF}$) to be less than or equal to $F*V_{bus}$, wherein F is in a range of 0.8 to 0.99.

14. The system, as recited in claim 8, wherein the electric machine is a polyphase machine.

15. A method for controlling an electric machine by an inverter controller arranged to direct a power converter, comprising
determining a feedforward vector ($V_{FF}$);
determining a feedback vector ($V_{FB}$);
comparing a magnitude of a sum of the feedforward vector and feedback vector ($|V_{FF}+V_{FB}|$) and a maximum bus value ($V_{bus}$);
when $|V_{FF}+V_{FB}|\leq V_{bus}$, providing a control vector of $V_{FF}+V_{FB}$ to the electric machine; and
when $|V_{FF}+V_{FB}|>V_{bus}$, providing a control vector of $V_{FF}+k(V_{FB})$ to the electric machine, where $0\leq k<1$ and where $|V_{FF}+k(V_{FB})|=V_{bus}$.

16. The method, as recited in claim 15, wherein the feedforward vector is at least one of a feedforward voltage vector, feedforward current vector, and feedforward force vector and wherein the feedback vector is at least one of a feedback voltage vector, feedback current vector, and feedback force vector and wherein the maximum bus value is at least one of a maximum bus voltage value, maximum bus current value, and maximum bus force value.

17. The method, as recited in claim 15, wherein the feedforward vector is a vector in a dq frame of reference indicating a current state of an electric machine and the feedback vector is a vector in a dq frame of reference indicating a direction of change for the electric machine.

18. The method, as recited in claim 15, wherein the inverter controller is arranged to direct a power converter to cause pulsed operation of an electric machine.

19. A control system for an electric machine with a maximum bus value $V_{bus}$, wherein the control system is configured to:
determine a feedforward vector ($V_{FF}$);
determine a feedback vector ($V_{FB}$);
determine a first convex boundary centered at an origin, wherein a minimum distance from the first convex boundary to the origin is equal to $V_{bus}$ and wherein a shape of the first convex boundary is determined by overmodulation provided by the control system; and
determine a second convex boundary, wherein the second convex boundary is centered at the origin and lies entirely on or within the first convex boundary;
wherein when a vector sum ($V_{FF}+V_{FB}$) lies inside the first convex boundary providing a control vector of $V_{FF}+V_{FB}$ to the electric machine,
wherein when the vector sum ($V_{FF}+V_{FB}$) lies outside the first convex boundary then providing a scaled $V_{FF}$ of $k_1 V_{FF}$ where $k_1=1$ if the vector $V_{FF}$ lies on or inside the second convex boundary and where $0<k_1<1$ if $V_{FF}$ lies outside the second convex boundary, wherein $k_1 V_{FF}$ lies on the second convex boundary, and if a vector sum $k_1 V_{FF}+V_{FB}$ lies outside the first convex boundary, then providing a scaled $V_{FB}$ of $k_2 V_{FB}$, where $k_1 V_{FF}+k_2 V_{FB}$ lies on the first convex boundary and $0\leq k_2\leq 1$, and
providing the vector sum $k_1 V_{FF}+V_{FB}$ to the electric machine when vector sum $k_1 V_{FF}+V_{FB}$ lies inside the first convex boundary and providing the vector sum $k_1 V_{FF}+k_2 V_{FB}$ to the electric machine when vector sum $k_1 V_{FF}+V_{FB}$ lies outside the first convex boundary.

20. The control system of claim 19, where the second convex boundary is the same as the first convex boundary.

21. The control system of claim 19, where the second convex boundary is equal to the first convex boundary scaled according to a factor F, where F is in a range between 0.8 and 1.

22. The control system of claim 19, where the first and second boundaries are circles.

23. The control system of claim 19, where the first and second boundaries are regular polygons.

24. The control system of claim 19, where the first convex boundary is a regular polygon and the second convex boundary is a circle.

25. The control system of claim 19, wherein the second convex boundary is a circle with a radius equal to the maximum bus value $V_{bus}$.

26. A method for controlling an electric machine by an inverter controller arranged to direct a power converter, wherein the electric machine has a maximum bus voltage $V_{bus}$, the method comprising
determining a feedforward vector ($V_{FF}$);
determining a feedback vector ($V_{FB}$);
determining a first convex boundary centered at an origin, wherein a minimum distance from the first convex boundary to the origin is equal to $V_{bus}$ and wherein a shape of the first convex boundary is determined by overmodulation provided by the controller;
determining a second convex boundary, wherein the second convex boundary is centered at the origin and lies entirely on or within the first convex boundary;
determining if a vector sum ($V_{FF}+V_{FB}$) lies outside the first convex boundary;
when a vector sum ($V_{FF}+V_{FB}$) lies inside the first convex boundary providing a control vector of $V_{FF}+V_{FB}$ to the electric machine;
when the vector sum ($V_{FF}+V_{FB}$) lies outside the first convex boundary then providing a scaled $V_{FF}$ of $k_1 V_{FF}$ where $k_1=1$ if the vector $V_{FF}$ lies on or inside the second convex boundary and where $0<k_1<1$ if $V_{FF}$ lies outside the second convex boundary, wherein $k_1 V_{FF}$ lies on the second convex boundary, and determining if a vector sum $k_1 V_{FF}+V_{FB}$ lies outside the first convex boundary, wherein if the vector sum $k_1 V_{FF}+V_{FB}$ lies outside the first convex boundary, providing a scaled $V_{FB}$ of $k_2V_{FB}$, where $k_1V_{FF}+k_2V_{FB}$ lies on the first convex boundary and $0 \leq k_2 \leq 1$; and providing the vector sum $k_1V_{FF}+V_{FB}$ to the electric machine when vector sum $k_1V_{FF}+V_{FB}$ lies inside the first convex boundary and providing the vector sum $k_1V_{FF}+k_2V_{FB}$ to the electric machine when vector sum $k_1V_{FF}+V_{FB}$ lies outside the first convex boundary.

27. The method of claim 26, where the second convex boundary is the same as the first convex boundary.

28. The method of claim 26, where the second convex boundary is equal to the first convex boundary scaled according to a factor F, where F is in a range between 0.8 and 1.

29. The method of claim 26, where the first and second boundaries are circles.

30. The method of claim 26, where the first and second boundaries are regular polygons.

31. The method of claim 26, where the first convex boundary is a regular polygon and the second convex boundary is a circle.

32. The method of claim 26, wherein the second convex boundary is a circle with a radius equal to the maximum bus value $V_{bus}$.

\* \* \* \* \*